United States Patent
Irvine et al.

(10) Patent No.: US 7,061,404 B2
(45) Date of Patent: Jun. 13, 2006

(54) APPARATUS AND METHOD FOR MULTIPLE DESCRIPTION ENCODING

(75) Inventors: Ann C. Irvine, Bonsall, CA (US); Vijayalakshmi R. Raveendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 88 days.

(21) Appl. No.: 10/715,573

(22) Filed: Nov. 17, 2003

(65) Prior Publication Data

US 2004/0141091 A1 Jul. 22, 2004

Related U.S. Application Data

(60) Provisional application No. 60/426,887, filed on Nov. 15, 2002.

(51) Int. Cl.
*H03M 7/00* (2006.01)
(52) U.S. Cl. .......................... 341/50; 341/51
(58) Field of Classification Search ............... 382/239, 382/232, 248, 250, 50, 56, 251; 375/240.18; 341/50, 51
See application file for complete search history.

(56) References Cited

U.S. PATENT DOCUMENTS

| | | | | |
|---|---|---|---|---|
| 5,107,345 A | | 4/1992 | Lee | .............................. 358/432 |
| 5,301,242 A | * | 4/1994 | Gonzales et al. | ............ 382/239 |
| 5,905,813 A | * | 5/1999 | Terane | .......................... 382/239 |
| 5,990,957 A | | 11/1999 | Ryoo | ........................... 348/405 |
| 6,111,913 A | * | 8/2000 | Murdock et al. | ....... 375/240.03 |
| 6,256,349 B1 | * | 7/2001 | Suzuki et al. | ........... 375/240.18 |
| 2002/0044602 A1 | | 4/2002 | Ohki | ...................... 375/240.03 |
| 2003/0228063 A1 | * | 12/2003 | Nakayama et al. | .......... 382/251 |
| 2004/0179608 A1 | * | 9/2004 | Holliman et al. | ....... 375/240.25 |

FOREIGN PATENT DOCUMENTS

| | | |
|---|---|---|
| EP | 0711079 A2 | 10/1995 |
| JP | 06233267 | 8/1994 |
| WO | WO 99/59344 | 11/1999 |

\* cited by examiner

*Primary Examiner*—Rexford Barnie
*Assistant Examiner*—Joseph Lauture
(74) *Attorney, Agent, or Firm*—Phillip R. Wadsworth; Sandip S. Minhas; Jae Hee-Choi

(57) ABSTRACT

An apparatus and method for generating multiple descriptions of compressed data are comprised. Generally, a quantized bit stream is generated using a reference quantization step. The quantized bit stream is then re-quantized using a first quantization step to generate a first description of compressed data, wherein the first quantization step is determined based on a first required scaling of the reference quantization step. The quantized bit stream may also be re-quantized using a second quantization step to generate a second description of compressed data, wherein the second quantization step is determined based on a second required scaling of the reference quantization step.

28 Claims, 7 Drawing Sheets

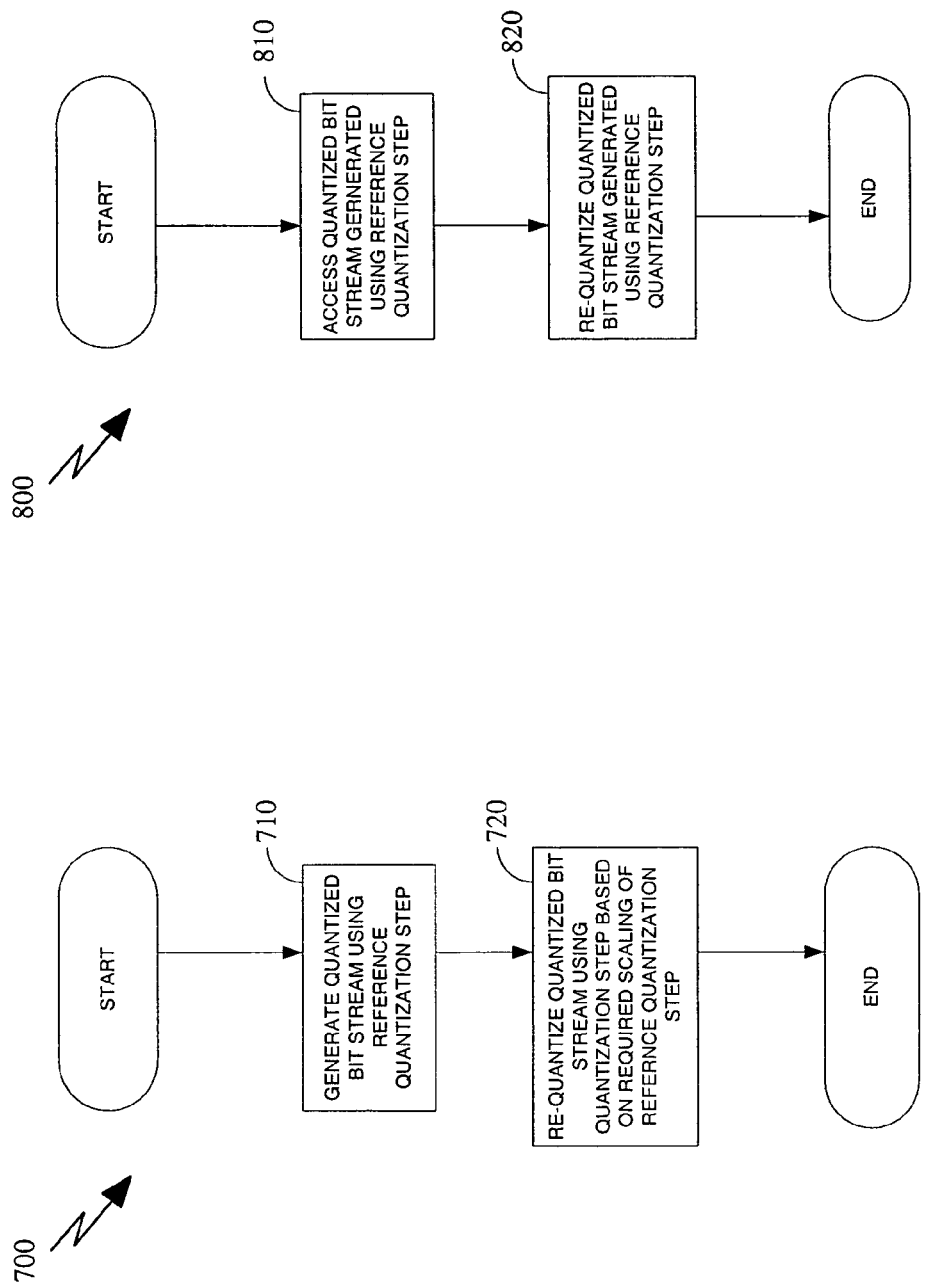

APPARATUS AND METHOD FOR MULTIPLE DESCRIPTION ENCODING

CROSS-REFERENCE TO RELATED APPLICATION

This application claims the benefit of U.S. Provisional Patent Application Ser. No. 60/426,887, filed Nov. 15, 2002, which is incorporated herein by reference in their entirety.

BACKGROUND

I. Field of Invention

The invention generally relates to multi media and more particularly to transform based compression system for generating multiple descriptions of data.

II. Description of the Related Art

Typically, digital information is compressed using a pre-selected format or process by an encoder. However, conventional digital consumer formats such as High Definition Television (HDTV), Digital Versatile Disc or Video Disc (DVD), Advanced Television Systems Committee (ATSC), Digital Video Broadcast (DVB), Digital Satellite System (DSS) operate at various specific resolutions, frame rates and/or bit rates. Accordingly, in order to cater to the various formats, a compression technique that can generate multiple descriptions of video is required.

Current video compression standards that provide multiple descriptions do so in an innate form or are targeted toward a discrete application. For example, Joint Photographic Experts Group (JPEG) 2000 can generate multiple descriptions of video by reducing the video. However, being intraframe and wavelet based, JPEG 2000 inherently provides lower resolution images. Moreover, it is restricted to being dyadic, i.e. reduction factors are multiples of two. Motion Picture Experts Group (MPEG) 4 also supports multiple description discrete cosine transform (DCT) that targets limited or fixed bandwidth applications such as Internet video. In this technique, a rudimentary form of the video is transmitted. Consecutive transmissions are made to enhance the details (bits) in the video. A major disadvantage in this approach is motion compensation.

Therefore there is a need for a more versatile, simple and/or efficient system that can generate multiple descriptions of video or video sequences.

SUMMARY

Embodiments disclosed herein address the above stated needs by providing a system for generating multiple descriptions of video. In one embodiment, a method for generating multiple descriptions of compressed data comprises generating a quantized bit stream using a reference quantization step; and re-quantizing the quantized bit stream using a first quantization step to generate a first description of compressed data, wherein the first quantization step is determined based on a first required scaling of the reference quantization step. An apparatus for generating multiple descriptions of compressed data comprises means for generating a quantized bit stream using a reference quantization step; and means for re-quantizing the quantized bit stream using a first quantization step to generate a first description of compressed data, wherein the first quantization step is determined based on a first required scaling of the reference quantization step. In the above embodiments, the quantized bit streams may be re-quantized using a second quantization step to generate a second description of compressed data, wherein the second quantization step is determined based on a second required scaling of the reference quantization step.

In another embodiment, an apparatus for generating multiple descriptions of compressed data comprises a transform module configured to generate transform coefficients from input data; and a quantization module coupled to the transform module, the quantization module configured to quantize the transform coefficients using a reference quantization step and to re-quantize the quantized transform coefficients using different quantization steps to generate multiple descriptions of compressed data, wherein each of the different quantization step is determined based on a required scaling of the reference quantization step. The quantization module may comprise a first quantization module configured to quantize the transform coefficients using the reference quantization step; and a second quantization module configured to re-quantize the quantized transform coefficients using the different quantization steps.

In further embodiment, a method for generating compressed data comprises accessing a quantized bit stream generated using a reference quantization step; and re-quantizing the quantized bit stream using a first quantization step to generate a first description of compressed data, wherein the first quantization step is determined based on a first required scaling of the reference quantization step. An apparatus for generating compressed data comprises means for accessing a quantized bit stream generated using a reference quantization step; and means for re-quantizing the quantized bit stream using a first quantization step to generate a first description of compressed data, wherein the first quantization step is determined based on a first required scaling of the reference quantization step. In the embodiments, the quantized bit stream may be re-quantize using a second quantization step to generate a second description of compressed data, wherein the second quantization step is determined based on a second required scaling of the reference quantization step.

In still another embodiment, an apparatus for generating compressed data comprises a storage medium configured to store a quantized bit stream generated using a reference quantization step; and a quantization module coupled to the storage medium and configured to re-quantize the quantized bit stream using different quantization steps to generate multiple descriptions of compressed data, wherein each of the different quantization step is determined based on a required scaling of the reference quantization step. The storage medium may be configured to store an archival compressed bit stream as the compressed bit stream.

In yet another embodiment, a method for generating multiple descriptions of compressed data comprises generating a quantized bit stream using a reference quantization step; encoding the quantized bit stream; decoding the encoded quantized bit stream; and re-quantizing the decoded quantized bit stream using a first quantization step to generate a first description of compressed data, wherein the first quantization step is determined based on a first required scaling of the reference quantization step. An apparatus for generating multiple descriptions of compressed data comprises means for generating a quantized bit stream using a reference quantization step; means for encoding the quantized bit stream; means for decoding the encoded quantized bit stream; and means for re-quantizing the decoded quantized bit stream using a first quantization step to generate a first description of compressed data, wherein the first quantization step is determined based on a first required scaling of the reference quantization step. In the embodiments, the decoded quantized bit stream may be re-quantized using a second quantization step to generate a second description of compressed data, wherein the second quantization step is determined based on a second required scaling of the reference quantization step.

In still a further embodiment, an apparatus for generating multiple descriptions of compressed data comprises a quantization module configured to generate a quantized bit stream using a reference quantization step; a coding module coupled to the quantization module and configured to encode the quantized bit stream; and a decoding module configured to decode the encoded quantized bit stream; wherein the quantization module is configured to re-quantize the decoded quantized bit stream using different quantization steps to generate multiple descriptions of compressed data, wherein each of the quantization step is determined based on a required scaling of the reference quantization step. The quantization module may comprise a first quantization module configured to generate the quantized bit stream using the reference quantization step; and a second quantization module configured to re-quantize the decoded quantized bit stream using the different quantization steps to generate the multiple descriptions of compressed data.

In yet a further embodiment, a method for generating compressed data based on encoded quantized bit steam comprises accessing compressed bit stream generated by quantization using a reference quantization step; decoding compressed bit stream to generate decoded quantized bit stream; and re-quantizing the decoded quantized bit stream using a first quantization step to generate a first description of compressed data, wherein the first quantization step is determined based on a first required scaling of the reference quantization step. An apparatus for generating compressed data based on encoded quantized bit steam comprises means for accessing compressed bit stream generated by quantization using a reference quantization step; means for decoding compressed bit stream to generate decoded quantized bit stream; and means for re-quantizing the decoded quantized bit stream using a first quantization step to generate a first description of compressed data, wherein the first quantization step is determined based on a first required scaling of the reference quantization step. In the embodiments, the decoded quantized bit stream may be re-quantized using a second quantization step to generate a second description of compressed data, wherein the second quantization step is determined based on a second required scaling of the reference quantization step.

In still yet another embodiment, an apparatus for generating multiple descriptions of compressed data based on encoded quantized bit steam comprises a storage medium configured to store a compressed bit stream generated by quantization using a reference quantization step; a decoding module configured to decode the compressed bit stream; and a quantization module configured to re-quantize the decoded compressed bit stream using different quantization steps to generate multiple descriptions of compressed data, wherein each of the quantization step is determined based on a required scaling of the reference quantization step. The storage medium may be configured to store an archival compressed bit stream as the compressed bit stream.

BRIEF DESCRIPTION OF THE DRAWINGS

Various embodiments will be described in detail with reference to the following drawings in which like reference numerals refer to like elements, wherein:

FIGS. 7–10 show example methods for generating multiple descriptions of compressed data.

DETAILED DESCRIPTION

Embodiments described below allow transform based compression system to generate multiple descriptions or compressed data stream from input video data stream. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, the term "video" refers to the visual portion of multimedia and will be used interchangeably with the term "image." A storage medium may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Generally, input digital information is quantized using a reference quantization step and re-quantized to output multiple descriptions of compressed bit streams, each catering to a different target application.

Figure 1:
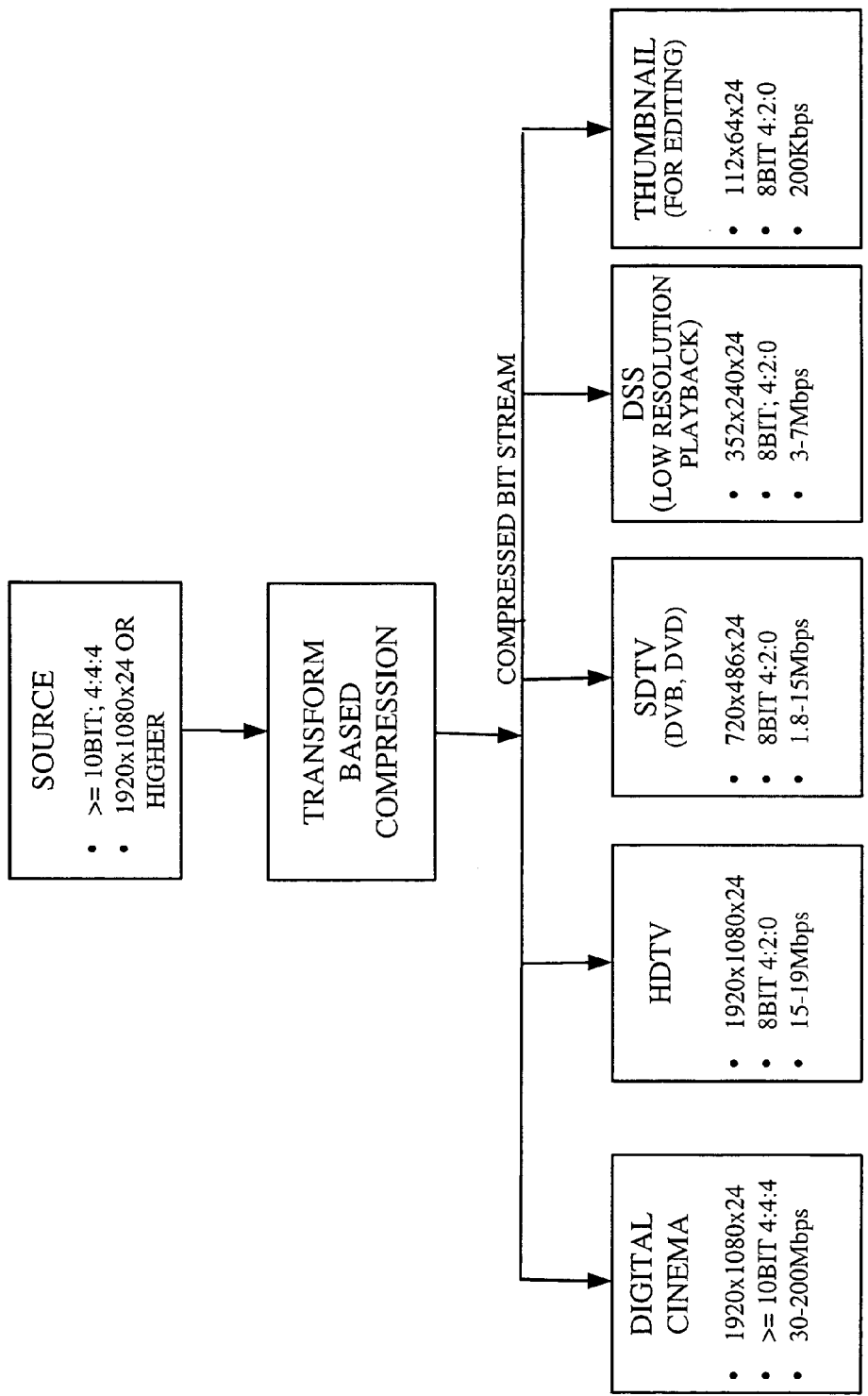
FIG. 1 shows example target applications.

FIG. 1 shows some target applications such as Digital Cinema, High Definition Television (HDTV), Standard Television (SDTV), Digital Satellite System (DSS) and thumbnails that operate at compressed bit streams of different resolutions and bit rates. Other applications include, but is not limited to, Digital Versatile Disc or Video Disc (DVD), Advanced Television Systems Committee (ATSC), Digital Video Broadcast (DVB). As shown, a source data may have a format of 10 bit, 4:4:4 and 1920×1080×24 or higher resolution. Digital Cinema requires a resolution of 1920×1080×24, a frame rate greater or equal to 10 bit 4:4:4 and bit rate of 30~200 Mbps. HDTV requires a resolution of 1920×1080×24, a frame rate of 8 bit 4:2:0 and bit rate of 15~19 Mbps. SDTV requires a resolution of 720×486×24, a frame rate of 8 bit 4:2:0 and bit rate of 1.8~15 Mbps. DSS requires a resolution of 352×240×24, a frame rate of 8 bit 4:2:0 and bit rate of 3~7 Mbps. Thumbnails requires a resolution of 112×64×24, a frame rate of 8 bit 4:2:0 and bit rate of 200 Mbps.

Figure 2:
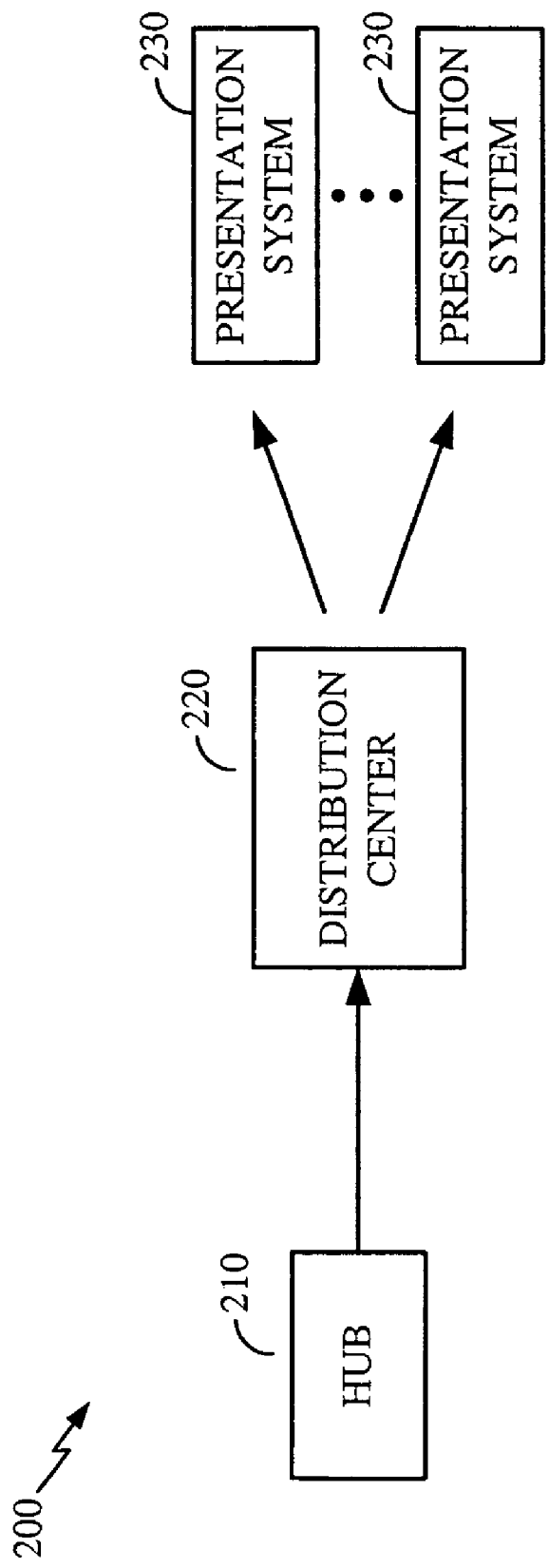
FIG. 2 shows an example of multiple description compression system for generating and playback of images.

FIG. 2 shows an example system 200 for generation and playback of image sequences based on a multiple description compression system. Generally, a hub 210 generates a compressed bit stream of a relatively high resolution. Here, the compressed data stream maybe for the highest possible resolution, hereinafter referred to as an archival compressed bit stream. Hub 210 outputs the compressed bit stream to a distribution center 220. Distribution center 220 may then output vanous compressed data of lower resolutions, each catering to a different target application or presentation system 230 for playback. It is to be noted that hub 210 and distribution center 220 maybe implemented together. Alternatively, hub 210 and distribution center 220 may be implemented as separate structures or at separate locations. Similarly, distribution center 220 and presentation system 230 maybe implemented together. Also similarly, distribution center 220 and presentation system 230 may be implemented as separate structures or at separate locations. If hub 210 and distribution center 220 or if distribution center 220 and presentation system 230 are implemented at separate location, data may be transmitted using a wireless medium, a non-wireless medium, a portable storage medium or a combination thereof.

Figure 3:
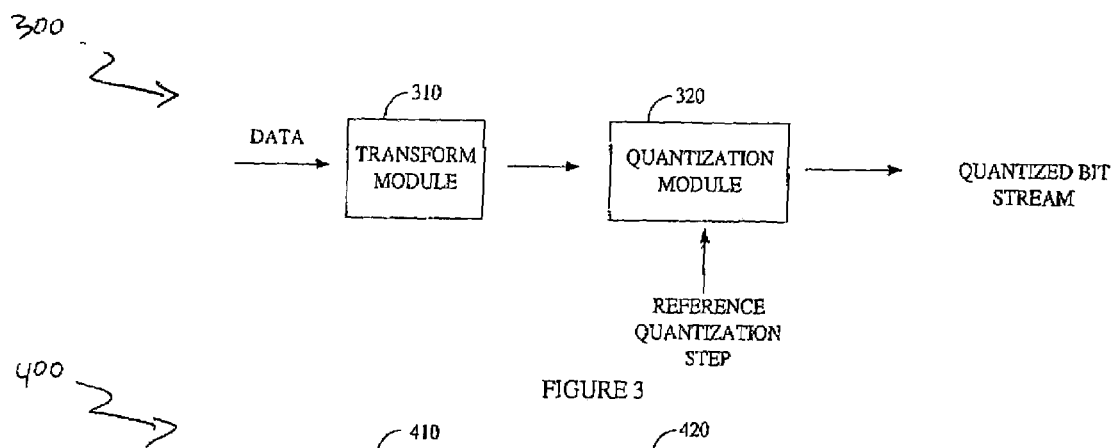
FIG. 3 shows an example encoder for a multiple description compression system.

More particularly, Hub 210 may include an encoder 300 shown in FIG. 3 that receives input data of digital video information, such as a motion image sequence, to be compressed. Encoder 300 is capable of compressing the input data into multiple descriptions of compressed data. Encoder 300 comprises a quantization module 320 configured to generate a quantized bit stream using a reference quantization step. Here, the reference quantization step may be a quantization step for generating an archival compressed bit stream. Encoder 300 may also comprise a transform module 310 configured to convert the input data and to generate transform coefficients. Here, various mathematical transforms such as, for example, discrete cosine transform (DCT), Hadamard transform and Integer transform, may be used by transform module 310. For example, if transform module 310 uses DCT, transform module 310 would transform input data from spatial to frequency domain and to generate DCT coefficients. Quantization module 320 then quantizes the DCT coefficients using the reference quantization step to generate the quantized bit stream.

Figure 4:
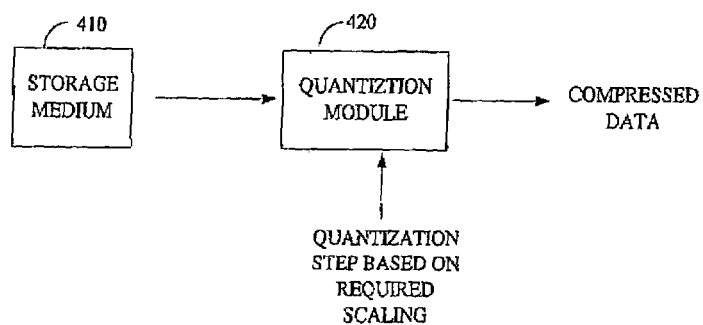
FIG. 4 shows an example server for a multiple description compression system.

Distribution center 220 may comprise a server 400 shown in FIG. 4 that provides compressed data to presentation system 230. Server 400 may comprise a storage medium 410 and a quantization module 420. Storage medium 410 stores a quantized bit steam received from hub 210. To generate a description of compressed data, quantization module 420 is configured to re-quantize the quantized bit stream using a quantization step tat is based on a required scaling of the reference quantization step. The required scaling of the reference quantization step may depend on the target application. The generated description of compressed data may then be used for playback at presentation system 230.

Figure 5:
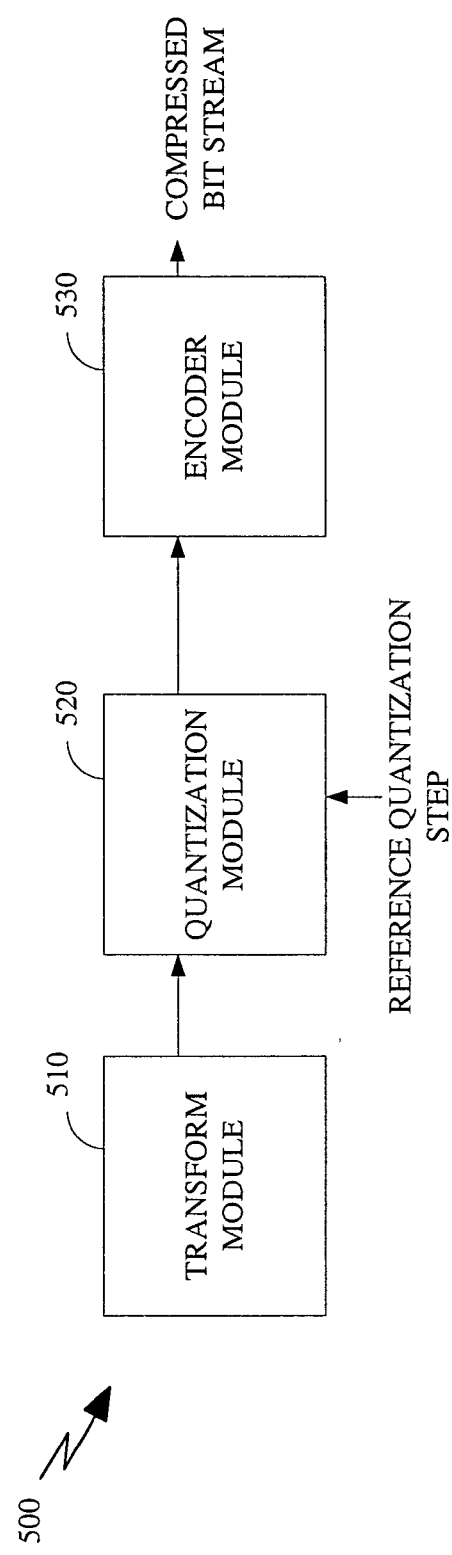
FIG. 5 shows another example encoder for a multiple description compression system.

It should be noted that either one or both encoder 300 and server 400 may also comprise other elements. FIG. 5 shows another example of an encoder 500 capable of compressing the input data into multiple descriptions of compressed data. Similar to encoder 300, encoder 500 comprises a quantization module 520 configured to generate a quantized bit stream using a reference quantization step. The reference quantization step may be a quantization step for generating an archival compressed bit stream. Encoder 500 may also comprise a transform module 510 and a coding module 530. As transform module 310, various mathematical transforms such as, for example, discrete cosine transform (DCT), Hadamard transform and Integer transform, may be used by transform module 510. Transform module 510 therefore generates transform coefficients. Quantization module 520 quantizes the transform coefficients using the reference quantization step to generate a quantized bit stream. Coding module 530 encodes the quantized bit stream to generate a compressed bit stream. In one embodiment, coding module 530 may be a variable length encoder. However, other coders also be used such as a Golomb coder, Rice Coder, Huffman engine, or other entropy encoders or a combination thereof.

Figure 6:
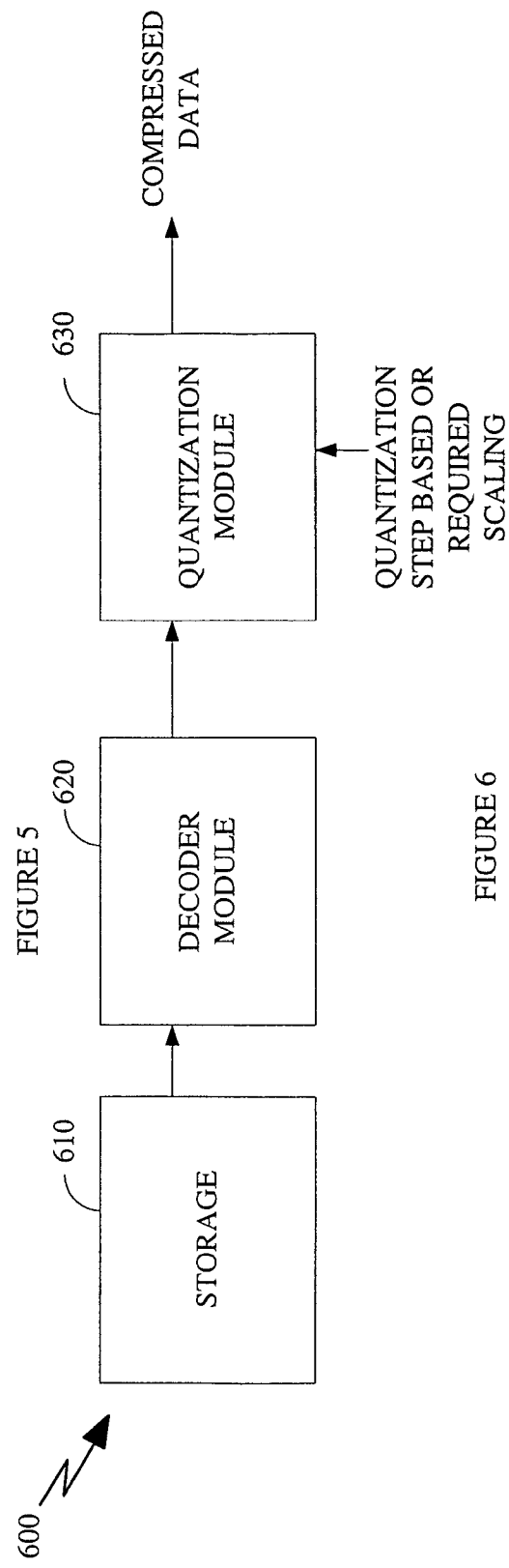
FIG. 6 shows another example server for a multiple description compression system.

FIG. 6 shows another example of a server 600 that provides compressed data to presentation system 230. Server 600 may comprise a storage medium 610, a decoding module 620 and a quantization module 630. Storage medium 610 stores a compressed bit stream received from hub 210 and decoding module 620 decodes the compressed bit stream to generate decoded quantized bit stream. To generate a description of compressed data, quantization module 630 is configured to re-quantize the decoded quantized bit stream using a quantization step that is based on a required scaling of the reference quantization step. The required scaling of the reference quantization step may depend on the target application. The generated description of compressed data may then be used for playback at presentation system 230.

Therefore, hub 210 and distribution center 220 can generate multiple descriptions of compressed data. More particularly, each of the different quantization step is determined based on a required scaling of the reference quantization step. For example, quantization module 420 or 630 may re-quantize the quantized bit stream using a first quantization step to generate a first description of compressed data. Quantization module 420 or 630 may re-quantize the quantized bit stream using a second quantization step to generate a second description of compressed data.

Referring back to FIG. 3, presentation system 230 comprises a decoder that decompresses the received compressed data using a decompression algorithm that is inverse to the compression algorithm used at encoder 300. For example, if compression is based on the DCT and variable length encoding, the image is processed by variable length decoding, inverse quantization and inverse DCT to enable display of the digital image.

It should be noted that a typical hub 210 may comprise other elements such as a processor (not shown) to control one or more elements of encoder 300 or 500. This processor may be implemented separately or as part of encoder 300 or 500, respectively. For example, a processor may provide the appropriate reference quantization step to quantization modules 320 and 520, respectively. Similarly, a processor (not shown) may also be implemented to control one or more elements of server 400 or 600. Such processor may be implemented as part of server 400 or 600, respectively or may be implemented outside of server 400 or 600, respectively. Here, a processor may, for example, determine the required scaling of the reference quantization step and provide the appropriate quantization step to quantization modules 420 and 630, respectively.

Hub 210 may also comprise a storage medium (not shown) to store a quantized bit stream and may comprise a second quantization module configured to re-quantize the quantized compressed bit stream. In addition, if hub 210 and distribution center 220 is implemented together, quantization modules 320 and 420 or quantization modules 520 and 630 may be implemented together, respectively. In such case, one quantization module would be configured to generate the quantized bit stream using a reference quantization step and to re-quantize the quantized bit stream using different quantization steps to generate multiple descriptions of compressed data. Alternatively, one quantization module comprising a first and second quantization modules may be implemented, wherein the first quantization module generates the quantized bit stream using a reference quantization step and the second quantization module re-quantizes the quantized bit stream using different quantization steps to generate multiple descriptions of compressed data.

Therefore, encoder 300 and server 400 may be used to generate multiple descriptions of compressed data. More particularly, FIG. 7 shows an example method 700 for generating multiple descriptions of compressed data. In method 700, a quantized bit stream is generated (710) using a reference quantization step. To generate a specific description of compressed data, the quantized bit stream is re-quantized (720) using a quantization step to generate a description of compressed data, wherein the quantization step is determined based on a required scaling of the reference quantization step.

FIG. 8 shows an example method 800 for generating compressed data when a quantized bit stream is generated in advance. In method 800, a quantized bit stream generated using a reference quantization step is accessed (810). The quantized bit stream is then re-quantized (820) using a first quantization step to generate a first description of compressed data, wherein the first quantization step is determined based on a first required scaling of the reference quantization step.

Figure 9:
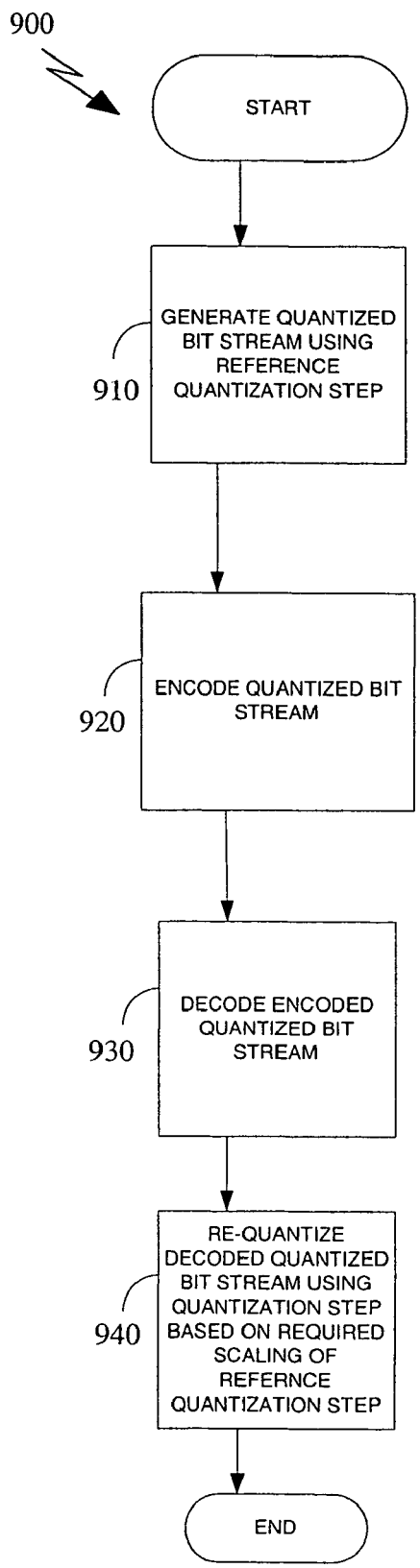

FIG. 9 shows an example method 900 for generating multiple descriptions of compressed data when a quantized bit stream is further encoded to generate a compressed bit stream. In method 900, a quantized bit stream is generated (910) using a reference quantization step. The quantized bit stream is then encoded (920) to generate a compressed bit stream. To generate a description of compressed data, the compressed bit stream is decoded (930) into decoded quantized bit stream. The decoded quantized bit stream is then re-quantized (940) using a quantization step to generate a description of compressed data, wherein the quantization step is determined based on a required scaling of the reference quantization step.

Figure 10:
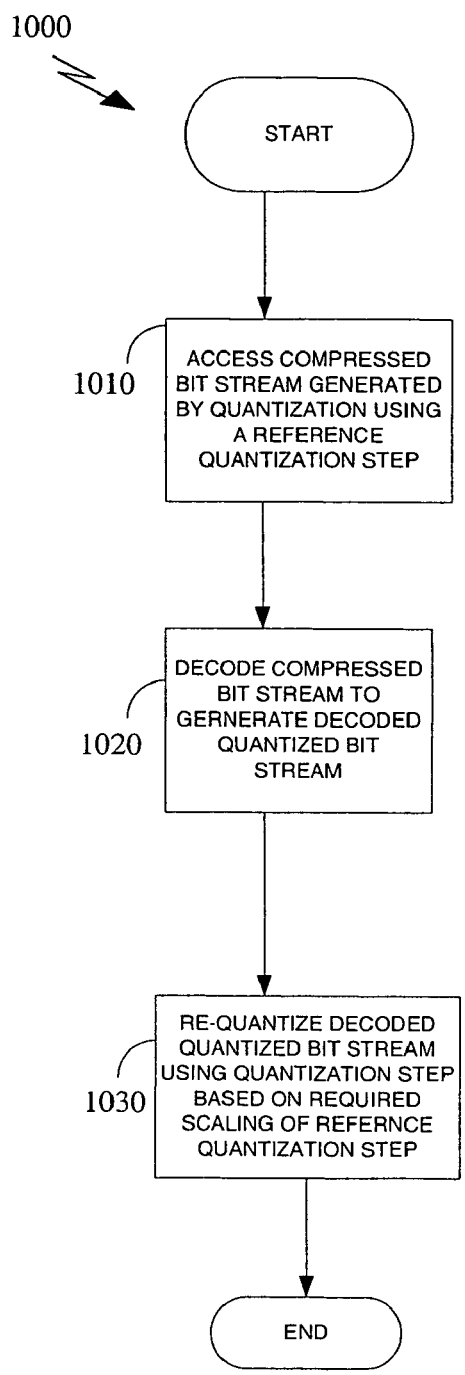

FIG. 10 shows an example method 1000 for generating compressed data when a quantized bit stream is generated in advance and is further encoded to generated a compressed bit stream. In method 1000, a compressed bit stream generated by quantization using a reference quantization step is accessed (1010). The compressed bit stream is decoded (1020) to generate decoded quantized bit stream. The decoded quantized bit stream is then re-quantized (1030) using a quantization step to generate a description of compressed data, wherein the quantization step is determined based on a required scaling of the reference quantization step.

Accordingly, different descriptions of compressed data may be generated by re-quantization using a different quantization step. More particularly, assume that the reference quantization step A corresponds to value a. If, for example, a target application requires a higher quantization step B that corresponds to value b or a higher quantization value c that corresponds to step C, the quantization step for the re-quantization would be determined based on the required scaling of the reference quantization step. Here, it would be b/a or c/a. In another example, a target application may require a bit rate that is lower than the bit rate resulting from the bit stream generated using the reference quantization step. If the required lower bit is half the current bit rate, the quantization step for re-quantization may be 2/a. It should be noted here that other scale factors may be used. Scale factors can be adapted to meet quality and bit rate requirements.

Furthermore, in compression techniques using typical DCT, the size of each data block is fixed. One dynamic image compression technique capable of offering significant compression while preserving the quality of image signals utilizes adaptively sized blocks and sub-blocks of encoded DCT coefficient data. This technique will hereinafter be referred to as the adaptive block size discrete cosine transform (ABSDCT). The adaptive block sizes are chosen to exploit redundancy that exists for information within a frame of image data. The technique is disclosed in U.S. Pat. No. 5,021,891, entitled "Adaptive Block Size Image Compression Method And System." DCT techniques are also disclosed in U.S. Pat. No. 5,107,345, entitled "Adaptive Block Size Image Compression Method And System," and the use of the ABSDCT technique in combination with a Discrete Quadtree Transform technique is discussed in U.S. Pat. No. 5,452,104, entitled "Adaptive Block Size Image Compression Method And System." The systems disclosed in these patents utilize intraframe encoding, wherein each frame of an image sequence is encoded without regard to the content of any other frame.

Figure 11B:
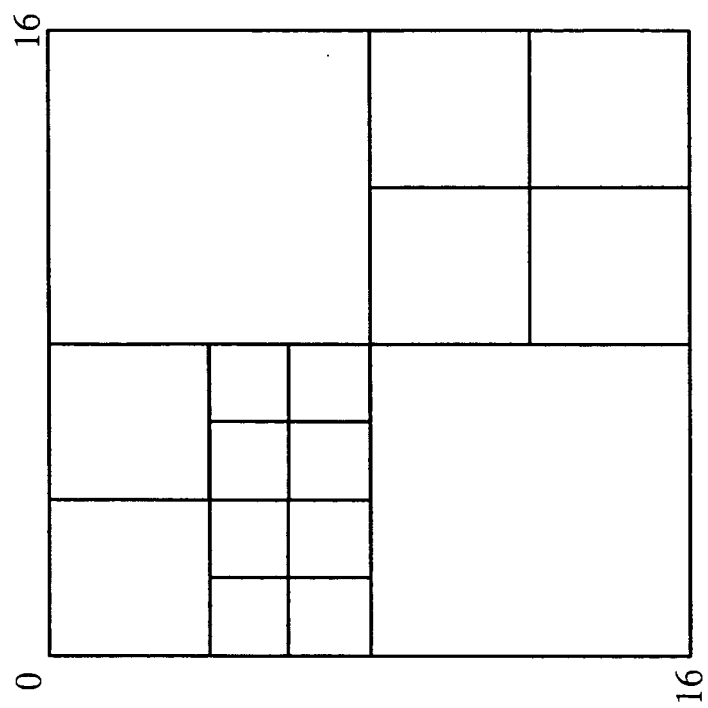
FIGS. 11A and 11B show adaptively sized blocks and sub-blocks for ABSDCT.
Figure 11A:
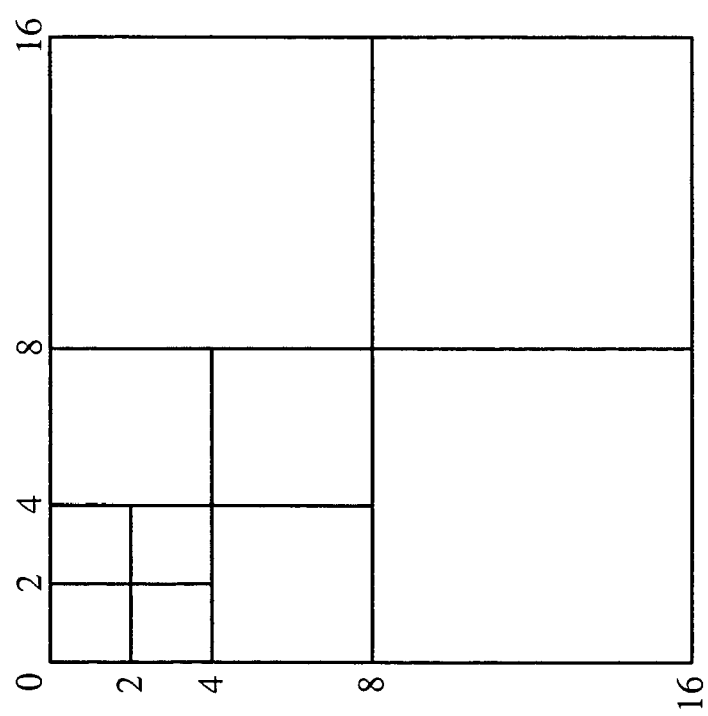

Generally, each of the luminance and chrominance components is passed to a block interleaver (not shown). A 16×16 block is presented to the block interleaver, which orders the image samples within the 16×16 blocks to produce blocks and composite sub-blocks of data for DCT analysis. FIG. 11A shows an example, where one 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks which requires the least number of bits to encode is chosen to represent the image segment. FIG. 11B shows an example where two 8×8 sub-blocks, six 4×4 sub-blocks, and eight 2×2 sub-blocks are chosen to represent the image segment. The chosen block or combination of sub-blocks is then properly arranged in order. The DCT coefficient values may then undergo further processing such as, but not limited to quantization and variable length coding. Therefore, in one embodiment, a DCT based compression system for generating multiple descriptions may use ABSDCT algorithm.

Accordingly, multiple layers of compressed data are generated to meet the requirements of target applications. Thereafter, necessary layers are extracted or cropped from the multiple layers to provide a specific description of compressed data for a target application.

It should be apparent to those skilled in the art that the elements of encoders and/or servers may be rearranged without affecting the operations. Also, embodiments may be implemented by hardware, software, firmware, middleware, microcode, or any combination thereof. When implemented in software, firmware, middleware or microcode, the program code or code segments to perform the necessary tasks may be stored in a machine readable medium respectively, or in a separate storage(s) not shown. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Therefore, the foregoing embodiments are merely examples and are not to be construed as limiting the invention. The description is intended to be illustrative, and not to limit the scope of the claims. As such, the present teachings can be readily applied to other types of apparatuses and many alternatives, modifications, and variations will be apparent to those skilled in the art.

The invention claimed is:

1. A method for generating multiple descriptions of compressed data from input data, wherein each description is associated with a target application, comprising:
generating a quantized bit stream using a reference quantization step, wherein the generation comprises transforming the input data into coefficients and quantizing the coefficients using the reference quantization step; and
re-quantizing the quantized bit stream using a first quantization step to generate a first description of compressed data, wherein the first quantization step is determined based on a first required scaling of the reference quantization step, said first required scaling being determined based on a first target application.

2. The method of claim 1, further comprising:
re-quantizing the quantized bit stream using a second quantization step to generate a second description of compressed data, wherein the second quantization step is determined based on a second required scaling of the reference quantization step, said second required scaling being determined based on a second target application.

3. The method of claim 1, wherein generating the quantized bit stream comprises:
using as the reference quantization step a quantization step for generating an archival compressed bit stream.

4. Apparatus for generating multiple descriptions of compressed data from input data, wherein each description is associated with a target application, comprising:
means for generating a quantized bit stream using a reference quantization step, said quantized bit steam being generated by transforming the input data into coefficients and quantizing the coefficients using the reference quantization step; and
means for re-quantizing the quantized bit stream using a first quantization step to generate a first description of compressed data, wherein the first quantization step is determined based on a first required scaling of the reference quantization step, said first required scaling being determined based on a first target application.

5. The apparatus of claim 4, further comprising:
means for re-quantizing the quantized bit stream using a second quantization step to generate a second description of compressed data, wherein the second quantization step is determined based on a second required scaling of the reference quantization step, said second required scaling being determined based on a second target application.

6. The apparatus of claim 4, wherein the means for generating the quantized bit stream comprises:
means for using as the reference quantization step a quantization step for generating an archival compressed bit stream.

7. Apparatus for generating multiple descriptions of compressed data from input data, wherein each description is associated with a target application, comprising:
a transform module configured to generate transform coefficients from the input data; and
a quantization module coupled to the transform module, the quantization module configured to quantize the transform coefficients using a reference quantization step and to re-quantize the quantized transform coefficients using different quantization steps to generate multiple descriptions of compressed data, wherein each of the different quantization steps is determined based on a required scaling of the reference quantization step, said the required scaling being determined based on a desirable target application.

8. The apparatus of claim 7, wherein the quantization module comprises:
a first quantization module configured to quantize the transform coefficients using the reference quantization step; and
a second quantization module configured to re-quantize the quantized transform coefficients using the different quantization steps.

9. A method for generating compressed data from input data, comprising:
accessing a quantized bit steam generated using a reference quantization step, said quantized bit stream being generated by transforming the input data into coefficients and quantizing the coefficients using the reference quantization step; and
re-quantizing the quantized bit stream using a first quantization step to generate a first description of compressed data associated with a first target application, wherein the first quantization step is determined based on a first required scaling of the reference quantization step, said first required scaling being determined based on the first target application.

10. The method of claim 9, further comprising:
re-quantizing the quantized bit stream using a second quantization step to generate a second description of compressed data associated with a second target application, wherein the second quantization step is determined based on a second required scaling of the reference quantization step, said second required scaling being determined based on the second target application.

11. Apparatus for generating compressed data from input data, comprising:
means for accessing a quantized bit steam generated using a reference quantization step, said quantized bit stream being generated by transforming the input data into coefficients and quantizing the coefficients using the reference quantization step; and means for re-quantizing the quantized bit stream using a first quantization step to generate a first description of compressed data associated with a first target application, wherein the first quantization step is determined based on a first required scaling of the reference quantization step, said first required scaling being determined based on the first target application.

12. The apparatus of claim 11, further comprising:

means for re-quantizing the quantized bit stream using a second quantization step to generate a second description of compressed data associated with a second target application, wherein the second quantization step is determined based on a second required scaling of the reference quantization step, said second required scaling being determined based on the second target application.

13. Apparatus for generating compressed data from input data, comprising:

a storage medium configured to store a quantized bit stream generated using a reference quantization step, wherein quantized bit stream being generated by transforming the input data into coefficients and quantizing the coefficients using the reference quantization step; and a quantization module coupled to the storage medium and configured to re-quantize the quantized bit stream using different quantization steps to generate multiple descriptions of compressed data associated with different target applications, wherein each of the different quantization steps is determined based on a required scaling of the reference quantization step, said required scaling being determined based on a desirable target application.

14. The apparatus of claim 13, wherein the storage medium is configured to store an archival compressed bit stream as the compressed bit stream.

15. A method for generating multiple descriptions of compressed data from input data, wherein each description is associated with a target application, comprising:

generating a quantized bit stream using a reference quantization step, wherein the generation comprises transforming the input data into coefficients and quantizing the coefficients using the reference quantization step;

encoding the quantized bit stream;

decoding the encoded quantized bit stream; and re-quantizing the decoded quantized bit steam using a first quantization step to generate a first description of compressed data associated with a first target application, wherein the first quantization step is determined based on a first required scaling of the reference quantization step, said first required scaling being determined based on the first target application.

16. The method of claim 15, further comprising:

re-quantizing the decoded quantized bit stream using a second quantization step to generate a second description of compressed data associated with a second target application, wherein the second quantization step is determined based on a second required scaling of the reference quantization step, said second required scaling being determined based on the second target application.

17. The method of claim 15, wherein generating the quantized bit stream comprises:

using as the reference quantization step a quantization step for generating an archival compressed bit stream.

18. An apparatus for generating multiple descriptions of compressed data from input data, wherein each description is associated with a target application, comprising:

means for generating a quantized bit stream using a reference quantization step, said quantized bit stream being generated by transforming the input data into coefficients and quantizing the coefficients using the reference quantization step;

means for encoding the quantized bit stream;

means for decoding the encoded quantized bit stream; and means for re-quantizing the decoded quantized bit stream using a first quantization step to generate a first description of compressed data associated with a first target application, wherein the first quantization step is determined based on a first required scaling of the reference quantization step, said first required scaling being determined based on the first target application.

19. The apparatus of claim 18, further comprising:

means for re-quantizing the decoded quantized bit stream using a second quantization step to generate a second description of compressed data associated with a second target application, wherein the second quantization step is determined based on a second required scaling of the reference quantization step, said second required scaling being determined based on the second target application.

20. Apparatus for generating multiple descriptions of compressed data from input data, wherein each description is associated with a target application, comprising:

a transform module configured to transform the input data into coefficients;

a quantization module configured to generate a quantized bit stream using a reference quantization step, wherein the quantization module quantizes the coefficients using the reference quantization step;

a coding module coupled to the quantization module and configured to encode the quantized bit stream; and a decoding module configured to decode the encoded quantized bit stream;

wherein the quantization module is configured to re-quantize the decoded quantized bit stream using different quantization steps to generate multiple descriptions of compressed data, wherein each of the quantization steps is determined based on a required scaling of the reference quantization step, said required scaling being determined based on a desirable target application.

21. The apparatus of claim 20, wherein the quantization module comprises:

a first quantization module configured to generate the quantized bit stream using the reference quantization step; and a second quantization module configured to re-quantize the decoded quantized bit stream using the different quantization steps to generate the multiple descriptions of compressed data.

22. A method for generating compressed data from input data based on encoded quantized bit stream, comprising:

accessing compressed quantized bit stream generated by quantization using a reference quantization step, said compressed quantized bit stream being generated by transforming the input data into coefficients and quantizing the coefficients using the reference quantization step;

decoding the compressed quantized bit stream to generate decoded quantized bit stream; and re-quantizing the decoded quantized bit stream using a first quantization step to generate a first description of compressed data associated with a first target application, wherein the first quantization step is determined based on a first required scaling of the reference quantization step, said first required scaling being determined based on the first target application.

23. The method of claim 22, further comprising:
re-quantizing the decoded quantized bit stream using a second quantization step to generate a second description of compressed data associated with a second target application, wherein the second quantization step is determined based on a second required scaling of the reference quantization step, said second required scaling being determined based on the second target application.

24. The method of claim 22, wherein accessing the compressed bit stream comprises:
accessing an archival compressed quantized bit stream generated using as the reference quantization step a quantization step for generating an archival compressed bit stream.

25. Apparatus for generating compressed data from input data based on encoded quantized bit stream, the apparatus comprising:
means for accessing compressed quantized bit stream generated by quantization using a reference quantization step, said compressed quantized bit stream being generated by transforming the input data into coefficients and quantizing the coefficients using the reference quantization step;
means for decoding compressed quantized bit stream to generate decoded quantized bit stream; and
means for re-quantizing the decoded quantized bit stream using a first quantization step to generate a first description of compressed data associated with a first target application, wherein the first quantization step is determined based on a first required scaling of the reference quantization step, said first required scaling being determined based on the first target application.

26. The apparatus of claim 25, further comprising:
means for re-quantizing the decoded quantized bit stream using a second quantization step to generate a second description of compressed data associated with a second target application, wherein the second quantization step is determined based on a second required scaling of the reference quantization step, said second required scaling being determined based on the second target application.

27. Apparatus for generating multiple descriptions of compressed data from input data based on encoded quantized bit steam, wherein each description is associated with a target application, the apparatus comprising:
a storage medium configured to store a compressed quantized bit stream generated by quantization using a reference quantization step, said compressed quantized bit stream being generated by transforming the input data into coefficients and quantizing the coefficients using the reference quantization step;
a decoding module configured to decode the compressed bit stream; and
a quantization module configured to re-quantize the decoded compressed bit stream using different quantization steps to generate multiple descriptions of compressed data, wherein each of the quantization steps is determined based on a required scaling of the reference quantization step, said required scaling being determined based on a desirable target application.

28. The apparatus of claim 27, wherein the storage medium is configured to store an archival compressed bit stream as the compressed bit stream.

* * * * *